(12) United States Patent
Morita

(10) Patent No.: US 6,323,758 B1
(45) Date of Patent: Nov. 27, 2001

(54) VIBRATION GENERATING UNIT

(75) Inventor: Yuichi Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/444,572

(22) Filed: Nov. 19, 1999

(30) Foreign Application Priority Data

Nov. 20, 1998 (JP) ................................................ 10-331054

(51) Int. Cl.$^7$ ...................................................... H04B 3/36
(52) U.S. Cl. ........................................ 340/407.1; 340/311
(58) Field of Search .............................. 340/311.1, 407.1, 340/825.46; 381/150, 151, 417, 431

(56) References Cited

U.S. PATENT DOCUMENTS

| | | | | |
|---|---|---|---|---|
| 5,107,540 | * | 4/1992 | Mooney et al. | 340/407.1 |
| 5,175,459 | * | 12/1992 | Danial et al. | 340/407.1 |
| 5,708,726 | * | 1/1998 | Brinkley et al. | 340/311.1 |
| 5,894,263 | * | 4/1999 | Shimakawa et al. | 340/388.1 |
| 5,936,516 | * | 8/1999 | Narea et al. | 340/407.1 |

FOREIGN PATENT DOCUMENTS

| | | |
|---|---|---|
| 39-11331 | 6/1964 | (JP) . |
| 48-35337 | 9/1971 | (JP) . |
| 58-159873 | 9/1983 | (JP) . |
| 63-77676 | 5/1988 | (JP) . |
| 63-167532 | 11/1988 | (JP) . |
| 2-10684 | 1/1990 | (JP) . |
| 2-13385 | 1/1990 | (JP) . |
| 2-23198 | 2/1990 | (JP) . |
| 2-64289 | 5/1990 | (JP) . |
| 2-68591 | 5/1990 | (JP) . |
| 2-75182 | 6/1990 | (JP) . |
| 2-88346 | 7/1990 | (JP) . |
| 4-3630 | 1/1992 | (JP) . |
| 6-311693 | 11/1994 | (JP) . |
| 8-294260 | 11/1996 | (JP) . |
| 9-205763 | 8/1997 | (JP) . |
| 2571811 | 2/1998 | (JP) . |
| 10-215499 | 8/1998 | (JP) . |
| 10-258253 | 9/1998 | (JP) . |

* cited by examiner

Primary Examiner—Van T. Trieu
(74) Attorney, Agent, or Firm—Sughrue, Mion, Zinn, Macpeak & Seas, PLLC

(57) ABSTRACT

A vibration generating unit of the present invention includes a magnetic field generating device including a magnetic field generating section for generating a magnetic field in response to a voltage applied thereto and a voltage source for applying the voltage to the magnetic field generating section. A vibrator includes a fulcrum portion and a pair of magnetized portions positioned at opposite sides of the fulcrum portion. The magnetized portions are movable about the fulcrum portion in a seesaw fashion in response to the magnetic field generated by the magnetic field generating section.

13 Claims, 9 Drawing Sheets

Fig. 1
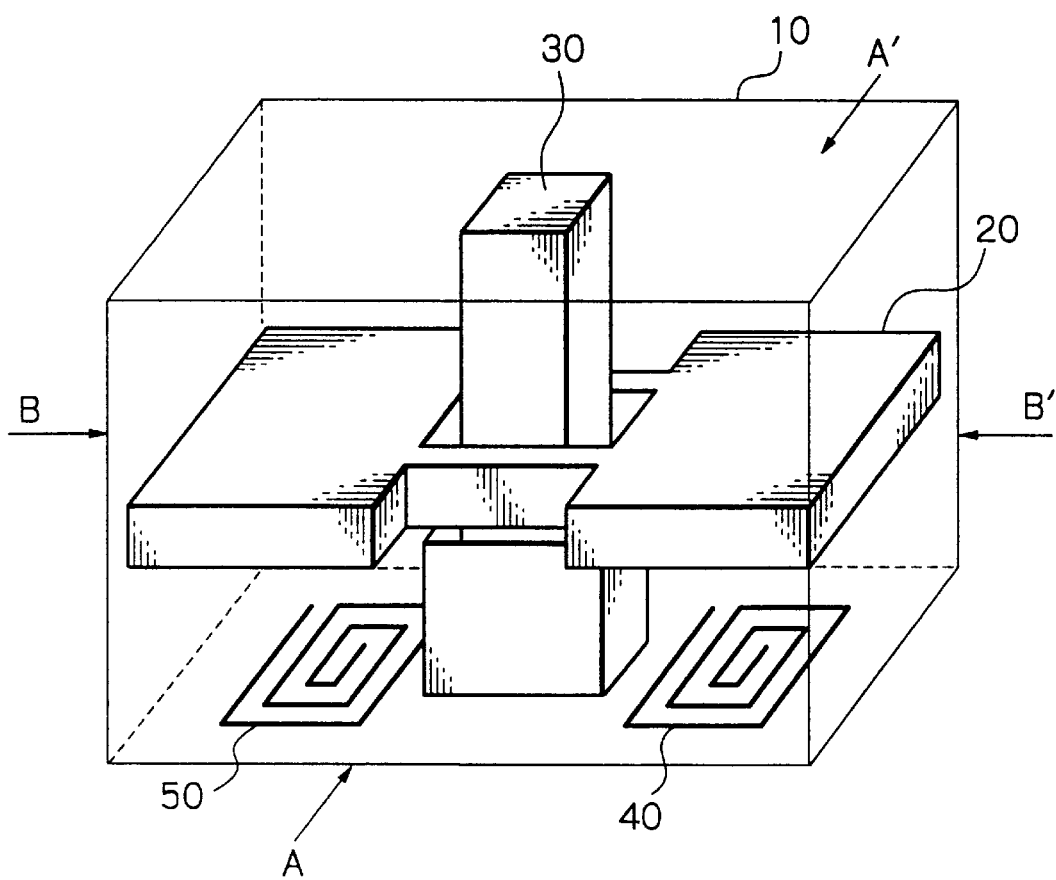
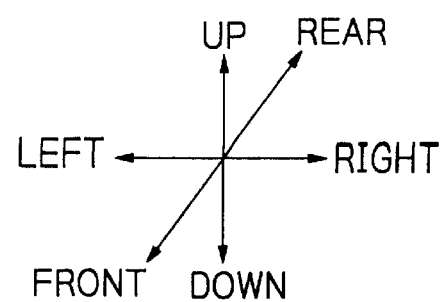

VIBRATION GENERATING UNIT

BACKGROUND OF THE INVENTION

The present invention relates to a vibration generating unit and more particularly to a vibration generating unit applicable to, e.g., a handy phone or a radio pager and capable of reducing irregularity in bodily sensed vibration.

A handy phone or a radio pager, for example, often includes a vibration type alerting unit usually implemented by a vibration motor. However, the problem with this type of alerting unit is that each vibration motor has a particular rotation speed and therefore a particular amount of vibration. Vibration available with the vibration motor is sometimes short. The vibration type alerting device has been proposed in various forms in the past, as follows.

(1) Japanese Utility Model Publication No. 2571811 proposes an alerting unit applicable to a radio pager or a handy phone and outputting both of vibration and sound. However, this alerting unit is not directed toward the stabilization of the amount of vibration.

(2) Japanese Utility Model Laid-Open Pub Ii cat ion No. 2-88346 teaches an actuator built in a radio pager for producing an alert. The actuator includes a miniature motor and an eccentric weight mounted on the output shaft of the motor. The actuator does not use an electromagnetic force.

(3) Japanese Patent Laid-Open Publication No. 4-3630 discloses a vibration generating unit for a radio pager. The unit includes an elongate, flat affixing plate and a vibration plate facing the affixing plate and connected at one end to one end of the affixing plate. An armature for generating an electromagnetic force is affixed to one of the facing portions of the affixing plate and vibration plate. A permanent magnet having either the North Pole or the South Pole is affixed to the other of the above two facing portions and located to face the armature. Means is provided for intermittently feeding a current to the armature. Although the device uses an electromagnetic force, the electromagnetic force is not directed toward the stabilization of the amount of vibration.

(3) Japanese Patent Laid-Open Publication No. 6-311693 proposes a flat vibration generating device applicable to, e.g., a pager and resembling a button type battery. This device also uses a vibration motor, but does not use an electromagnetic force.

Technologies relating to the present invention are also disclosed in, e.g., Japanese Patent Laid-Open Publication Nos. 10-215499, 8-294260, 9-205763, and 10-258253.

SUMMARY OF THE INVENTION

It is therefore an object of the present invention to provide a vibration generating unit capable of vibrating stably on the basis of an electromagnetic force.

It is another object of the present invention to provide a vibration generating unit capable of vibrating by a finely controllable amount.

A vibration generating unit of the present invention includes a magnetic field generating device including a magnetic field generating section for generating a magnetic field in response to a voltage applied thereto and a voltage source for applying the voltage to the magnetic field generating section. A vibrator includes a fulcrum portion and a pair of magnetized portions positioned at opposite sides of the fulcrum portion. The magnetized portions are movable about the fulcrum portion in a seesaw fashion in response to the magnetic field generated by the magnetic field generating section.

BRIEF DESCRIPTION OF THE DRAWINGS

The above and other objects, features and advantages of the present invention will become more apparent from the following detailed description taken with the accompanying drawings in which:

FIG. 1 is a perspective view showing a vibration generating unit embodying the present invention;

DESCRIPTION OF THE PREFERRED EMBODIMENT

Referring to FIG. 1 of the drawings, a vibration generating unit embodying the present invention is shown. It is to be noted that all the directions to be referred to hereinafter accord to the directions shown at the bottom right portion of FIG. 1. As shown, the vibration generating unit includes a case 10 accommodating a vibrator 20, a post 30 supporting the vibrator 20, and a first and a second magnetic field generating devices 40 and 50 for generating magnetic fields.

The post 30 extends upward from substantially the center of the bottom of the case 10. The magnetic field generating devices 40 and 50 are affixed to the bottom of the case 10 at the right and left of the post 30, as viewed in FIG. 1. The vibrator 20 has a weight greater than a preselected weight. The opposite end portions of the vibrator 20 in the right-and-left direction are magnetized, so that the vibrator 20 can move when subjected to magnetic fields generated by the devices 40 and 50. By controlling the generation of magnetic fields by the devices 40 and 50, it is possible to cause the vibrator 20 to vibrate.

The opposite magnetized portions of the vibrator 20 exert substantially the same magnetic force. The entire vibrator 20 is substantially symmetrical in configuration and weight in the right-and-left direction. To control the amount of vibration of the vibrator 20, a pulse voltage is applied to each of the magnetic field generating devices 40 and 50. In FIG. 1, a voltage source for applying the pulse voltage to the devices 40 and 50 or the detailed configuration of the vibrator 20 is not shown.

Figure 2:
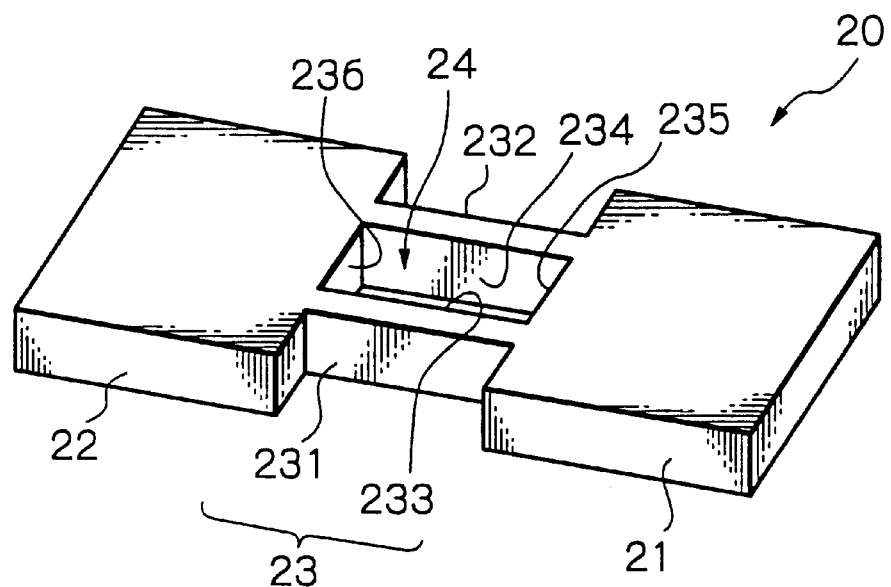
FIG. 2 is an isometric view of a vibrator included in the illustrative embodiment.

As shown in FIG. 2 in detail, the vibrator 20 is made up of a pair of magnetized end portions 21 and 22 and a connecting portion 23 connecting the end portions 21 and 22 to each other. The entire vibrator 20 behaves substantially as a rigid body. The right and left end portions 21 and 22 include permanent magnets and are subjected to the action of magnetic fields. The end portions 21 and 22 exert substantially the same magnetic force while the entire vibrator 20 is substantially symmetrical in configuration and weight in the right-and-left direction. More specifically, the end portions 21 and 22 should preferably be implemented only by permanent magnets identical in configuration, material, and magnetic force to exert.

The connecting portion 23 plays the role of a portion for supporting the vibrator 20 on the post 30 at the same time. The vibrator 20 is supported by the post 30 such that the opposite end portions 21 and 22 thereof are movable up and down in a seesaw fashion, i.e., in opposite directions to each other in the up-and-down direction. The connecting portion 23 is implemented by a pair of parallel bars 231 and 232 spaced from each other in the front-and-rear direction. The front and rear bars 231 and 232 form a through bore 24 therebetween for receiving the post 30. Let the surfaces of the front and rear bars 231 and 232 facing each other be referred to as a front inner surface 233 and a rear inner surface 234, respectively. Also, let the surfaces of the right and left end portions 21 and 22 facing each other within the bore 24 be referred to as a right inner face 235 and a left inner face 236.

Figure 3:
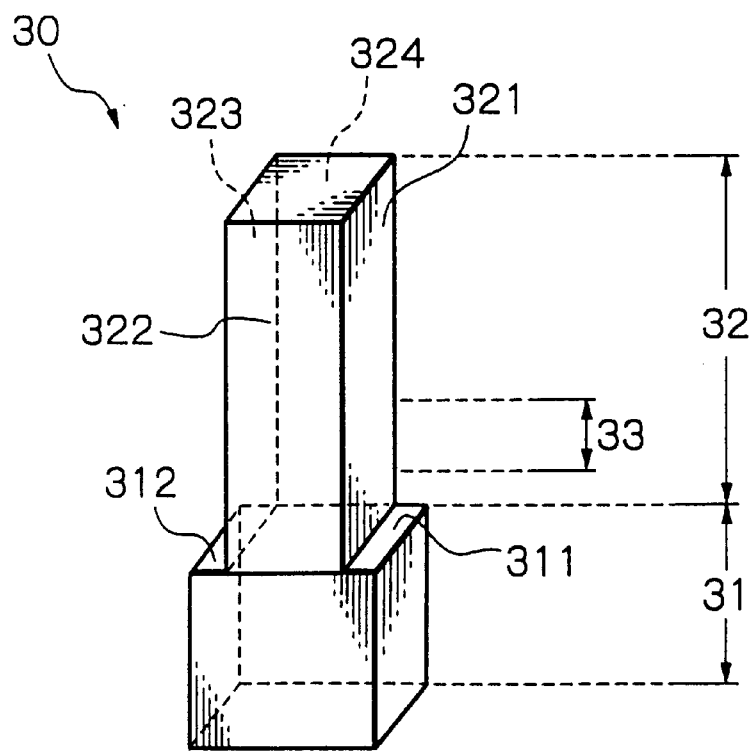
FIG. 3 is an isometric view of a post also included in the illustrative embodiment.

As shown in FIG. 3 specifically, the post 30 has an upper portion 32 and a lower portion 31 each having a rectangular parallelepiped configuration. The upper portion 32 has a smaller cross-sectional area than the lower portion 31 in the front-and-rear and right-and-left directions. The vibrator 20 is supported by a part 33 of the upper portion 32. The bars 231 and 232 of the vibrator 20 are respectively positioned at the front and rear of the part 33 of the upper portion 32.

The lower portion 31 has a cross-sectional area great enough to prevent the bore 24 of the vibrator 20 from passing thereover. By contrast, the upper portion 32 has a cross-sectional area small enough to allow the bore 24 to pass thereover. In a plane where the upper portion 32 and lower portion 31 join each other, the lower portion 31 has a right non-contact region 311 and a left non-contact region 312 not contacting the upper portion 32. The upper portion 32 has four sides, i.e., a left side 321, a front side 322, a right side 323, and a rear side 324.

Figure 4:
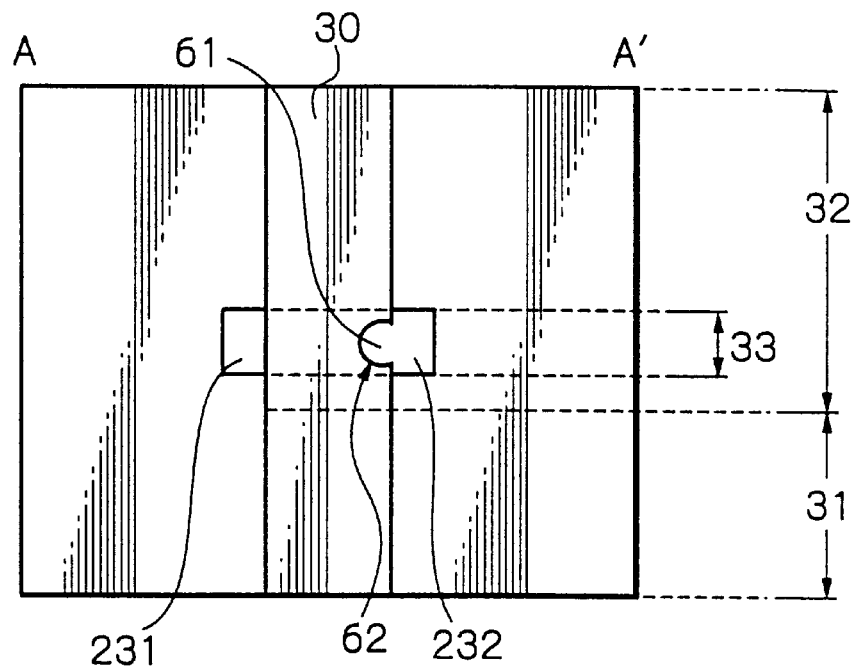
FIG. 4 is a section along line A–A' of FIG. 1 (front-and-rear and up-and-down directions)

FIG. 4 shows the post 30 and vibrator 20 supported by the post 30. As shown, a lug 61 protrudes from the rear inner surface 234 of the rear bar 232 and is received in a recess 62 formed in the rear side 322 of the part 33 of the post 30. In this condition, the vibrator 20 is supported by the post 30. To movably mount the vibrator 20 to the post 30, it is necessary that the distance between the tip of the lug 61 and the front inner surface 233 be greater than the distance between the front side 322 and the rear side 324 of the part 33. The opposite end portions 21 and 22 of the vibrator 20 are movable up and down in a seesaw movement about the part or fulcrum 33. The lug 61 and recess 62 each should preferably be provided with a hemispherical or a conical configuration.

The lug 61 and recess 62 connecting the vibrator 20 to the post 30 should preferably adjoin the center of gravity of the vibrator 20. This allows the opposite end portions 21 and 22 of the vibrator 20 to smoothly move in a seesaw fashion.

The distance between the tip of the lug 61 and the front inner surface 233 is greater than the distance between the front side 322 and the rear side 324 of the part 33 of the post 30, as stated earlier. Therefore, the lug 61 should preferably be formed of an elastic material so as to restore its shape when fitted in the recess 62.

Alternatively, the rear inner surface 234 of the rear bar 232 and the rear side 324 of the part 33 may be formed with a recess and a lug, respectively. In such a case, the distance between the tip of the lug and the front side 322 of the part 33 should be greater than the distance between the front inner surface 233 and the rear side 324.

Figure 5:
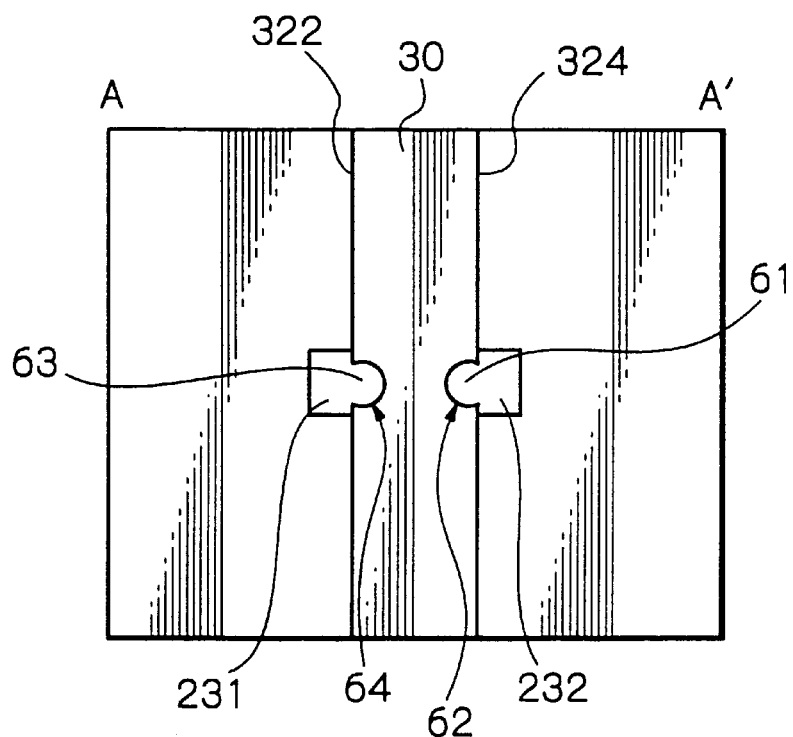
FIG. 5 is a section along line A–A' of FIG. 1 (front-and-rear and up-and-down directions, showing a specific modification of the illustrative embodiment.

FIG. 5 shows a modification of the structure for connecting the vibrator 20 to the post 30. As shown, a lug 63 protrudes from the front inner surface 233 of the front bar 231 in the same manner as the lug 61 protruding from the rear bard 232. Also, a recess 64 is formed in the front side 322 of the part 33 in the same manner as the recess 62 formed in the rear side 324. The lug 63 is received in the recess 64 and cooperates with the lug 61 to connect the vibrator 20 to the post 30. The lug 63 and recess 64 are identical in configuration and material with the lug 61 and recess 62. Again, the opposite end portions 21 and 22 of the vibrator 20 are movable up and down in a seesaw fashion about the above connecting portion.

The lugs 61 and 63 and recesses 62 and 64 forming the connecting portion should preferably adjoin the center of gravity of the vibrator 20. In addition, a line extending through the lugs 61 and 63 and recesses 62 and 64 should preferably be substantially perpendicular to the direction in which the vibrator 20 moves up and down. With this configuration, the connecting portion allows the opposite ends of the vibrator 20 to smoothly move up and down in a seesaw movement. Again, the rear inner surface 234 of the rear bar 232 and the rear side 324 of the part 33 may be formed with a recess and a lug, respectively. Also, the front inner surface 233 of the front bar 231 and the front side 322 of the part 33 may alternatively be formed with a recess and a lug, respectively.

Figure 6:
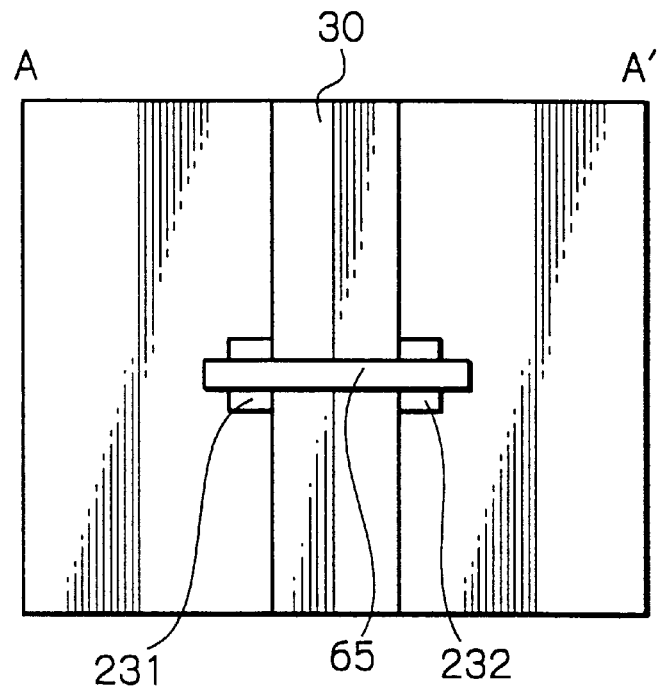
FIG. 6 is a section along line A–A' of FIG. 1 (front-and-rear and up-and-down directions, showing another specific modification of the illustrative embodiment.

FIG. 6 shows another modification of the structure for connecting the vibrator 20 to the post 30. As shown, a shaft 65 extends throughout the front bar 231, part 33 of the vibrator 20, and rear bar 232 and is substituted for the lug 61 and recess 62 of FIG. 4. The shaft 65 is so configured as not to obstruct the seesaw movement of the opposite end portions 21 and 22 of the vibrator 20. Specifically, the opposite end portions 21 and 22 are movable up and down about the shaft 65 in a seesaw fashion.

In the above modification, the shaft 65 should preferably extend substantially perpendicularly to the direction in which the vibrator 20 moves up and down. In addition, the shaft 64 should preferably adjoin the center of gravity of the vibrator 20. This also guarantees the smooth seesaw movement of the vibrator 20.

Figure 7:
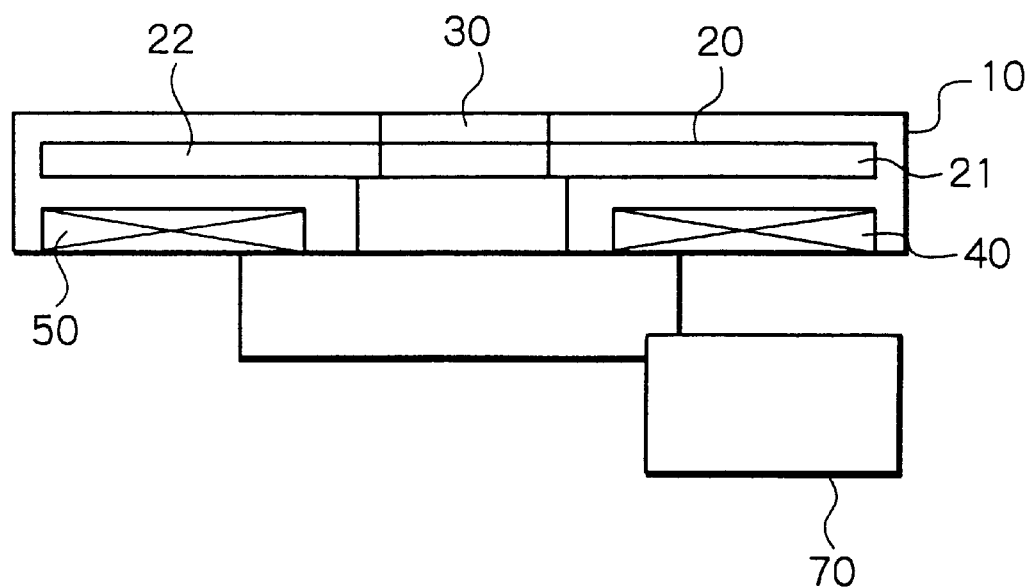
FIG. 7 is a side elevation showing the illustrative embodiment.

As shown in FIG. 7, the magnetic field generating devices 40 and 50 are connected to a voltage source 70, and each generates a magnetic field in response to a voltage applied from the voltage source 70. The right end portion 21 and left end portion 22 of the vibrator 20 are positioned above the devices 40 and 50, respectively. The magnetic fields generated by the devices 40 and 50 respectively act on the end portions or permanent magnets 21 and 22, causing the vibrator 20 to move in a seesaw fashion about the position where it is supported by the post 30.

Figure 8:
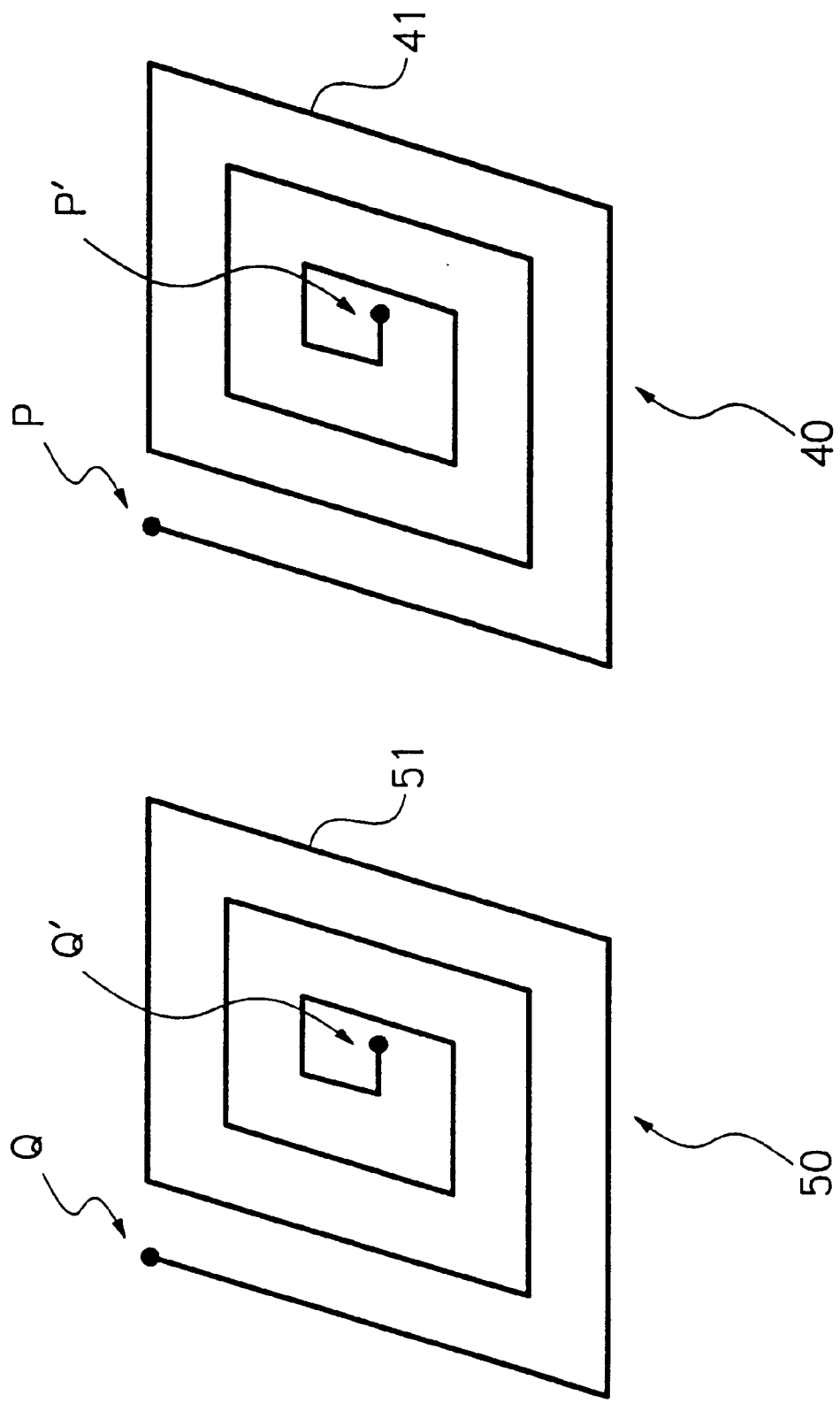
FIG. 8 is a view showing a specific configuration of magnetic field generating devices included in the illustrative embodiment.

FIG. 8 shows a specific configuration of the magnetic field generating devices 40 and 50. As shown, the devices 40 and 50 are respectively implemented by wirings 41 and 51 printed on a circuit board in the form of coils. The wiring 41 is connected to the voltage source 70, FIG. 7, at points P and P' while the wiring 42 is connected to the same at points Q and Q'. The points P and Q and points P' and Q' each are connected to the positive terminal or the negative terminal of the voltage source 70 in a pair. The devices 40 and 50 generate magnetic fields in the same direction when applied with voltages of the same sign from the voltage source 70.

A first specific operation of the vibrator 20 will be described hereinafter which occurs when the magnetic field generating devices 40 and 50, FIG. 7, have the configuration shown in FIG. 8, and when the end portions or permanent magnets 21 and 22 of the vibrator 20, FIG. 7, have the same polarity at their surfaces facing the devices 40 and 50, respectively. It is to be noted that the voltage source 70 applies positive voltages to the devices 40 and 50 by way of example.

When the voltage source 70 applies a voltage to the device 40, the device 40 generates a magnetic field to thereby move the right end portion 21 of the vibrator 20 up or down. As a result, the left end portion 22 of the vibrator 20 moves in the opposite direction to the right end portion 21, causing the vibrator 20 to bodily move about the connecting portion or fulcrum portion. Subsequently, when the voltage source 70 applies a voltage to the other device 50, the device 50 generates a magnetic field and moves the left end portion 22 of the vibrator in the same direction as the device 40 has moved the right end portion 21. This also causes the vibrator 20 to bodily move about the fulcrum portion. In this manner, the vibrator 20 repeatedly moves in a seesaw fashion to thereby generate vibration.

The above seesaw movement of the vibrator 20 also occurs when the voltage source 70 applies negative voltages to the devices 40 and 50.

Figure 9:
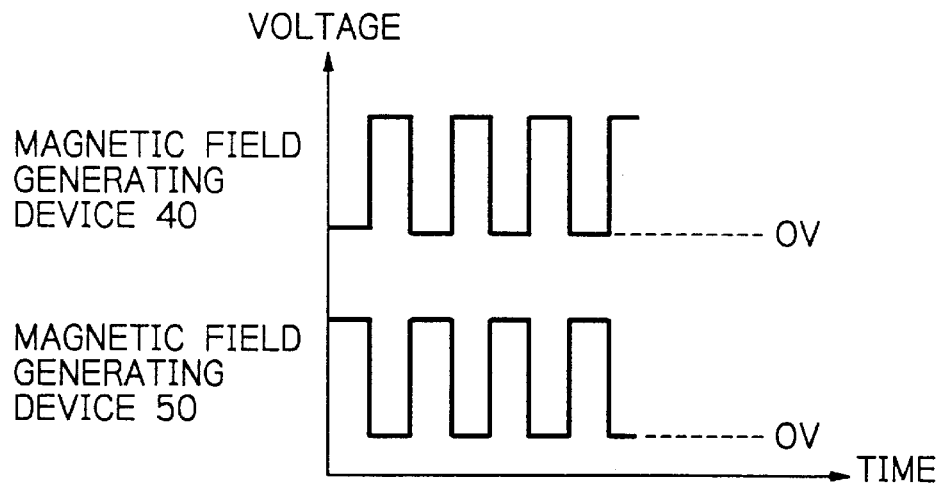
FIG. 9 is a timing chart showing pulse voltages applied from a voltage sour e to the magnetic field generating devices.

FIG. 9 shows pulse voltages alternately applied from the voltage source 70 to the devices 40 and 50 in opposite phases.

A second specific operation of the vibrator 20 is as follows. Assume that the devices 40 and 50 have the configuration shown in FIG. 8, but the end portions or permanent magnets 21 and 22 of the vibrator 20 have opposite polarities to each other at their surfaces facing the devices 40 and 50.

First, when the voltage source 70 applies a positive voltage to the device 40, the device 40 generates a magnetic field to thereby move the right end portion 21 of the vibrator 20 up or down. As a result, the left end portion 22 of the vibrator 20 moves in the opposite direction to the right end portion 21, causing the vibrator 20 to bodily move about the fulcrum portion. Subsequently, when the voltage source 70 applies a positive voltage to the other device 50, the device 50 generates a magnetic field and moves the left end portion 22 of the vibrator in the same direction as the device 40 has moved the right end portion 21. This also causes the vibrator 20 to bodily move about the fulcrum portion. The vibrator 20 therefore moves in the same manner as when voltages of the same polarity are applied to the devices 40 and 50.

Likewise, when the voltage source 70 applies a negative voltage to the device 40, the device 40 generates a magnetic field to thereby move the right end portion 21 of the vibrator 20 in the direction opposite tot he direction in which it previously moved the end portion 21. As a result, the left end portion 22 of the vibrator 20 moves in the opposite direction to the right end portion 21, causing the vibrator 20 to bodily move about the fulcrum portion. Subsequently, when the voltage source 70 applies a negative voltage to the other device 50, the device 50 generates a magnetic field and moves the left end portion 22 of the vibrator in the same direction as the right end portion 21 previously moved. This also causes the vibrator 20 to bodily move about the fulcrum portion.

Figure 10:
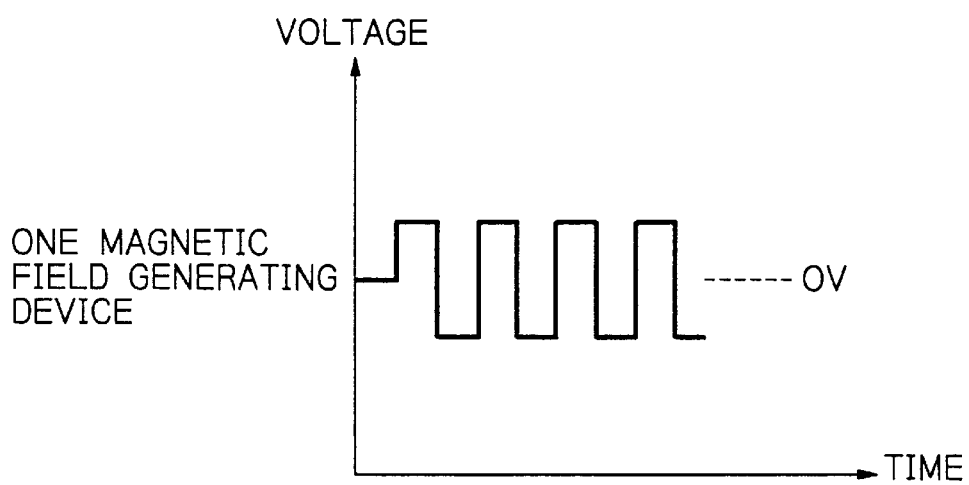
FIG. 10 is a timing chart showing pulse voltages applied to one of the magnetic field generating devices.
Figure 11:
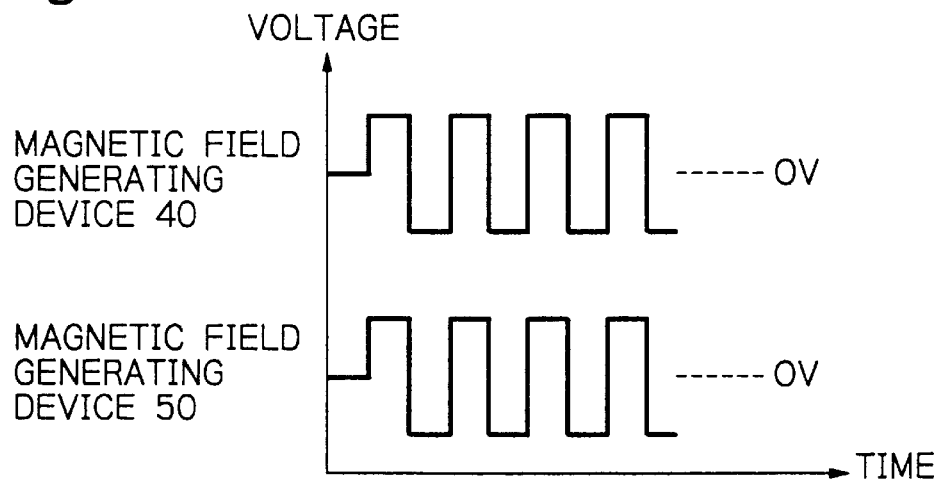
FIG. 11 is a timing chart showing pulse voltages applied to both of the magnetic field generating devices.

It follows that when the surfaces of the end portions or permanent magnets 21 and 22 facing the devices 40 and 50, respectively, are opposite in polarity to each other, positive and negative pulse voltages may be alternately applied to only one of the devices 40 or 50, as shown in FIG. 10. Alternatively, as shown in FIG. 11, pulse voltages of the same phase may be applied to both of the devices 40 and 50.

Figure 12:
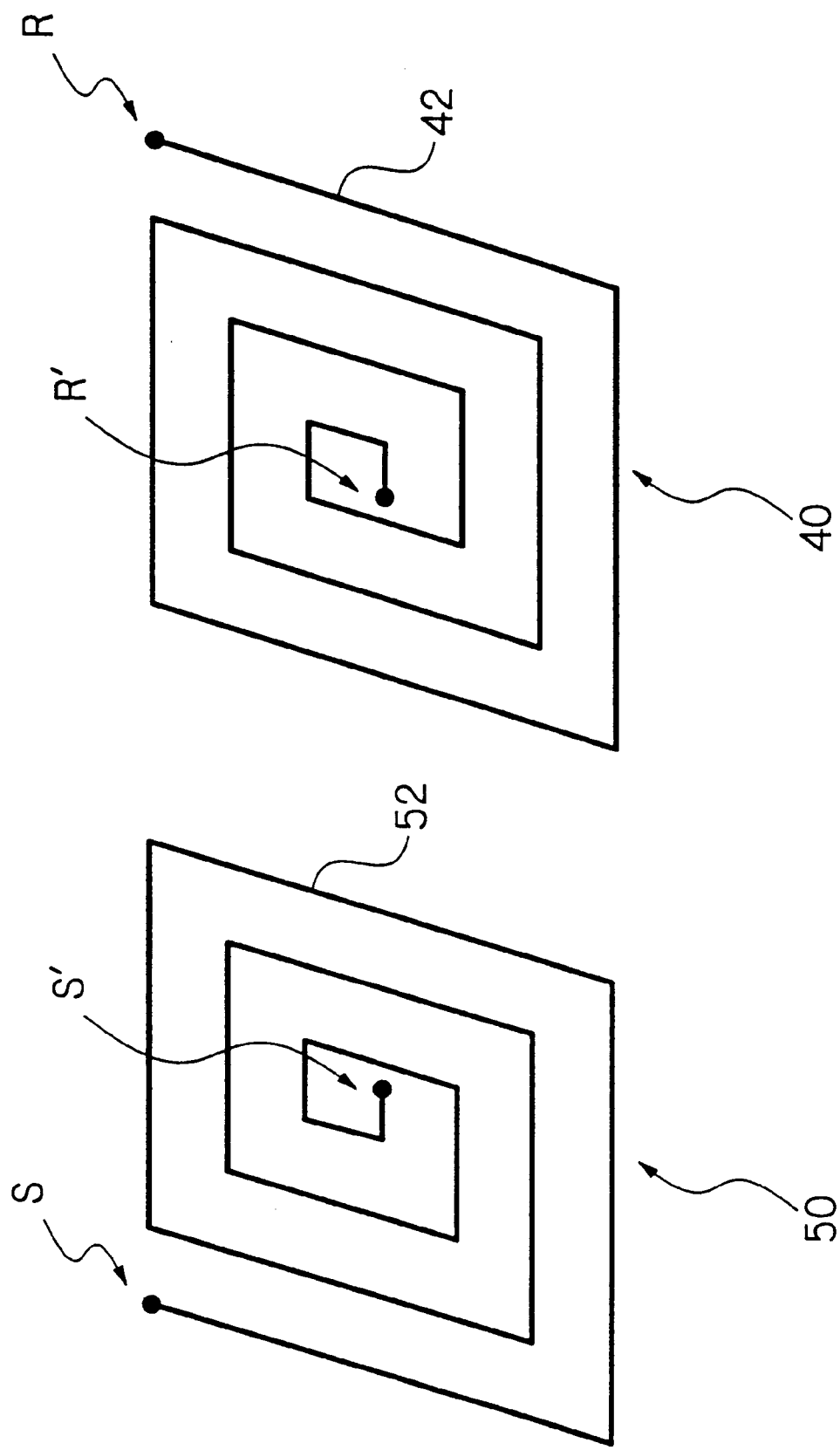
FIG. 12 is a view showing another specific configuration of the magnetic field generating devices.

FIG. 12 shows another specific configuration of the devices 40 and 50. As shown, the devices 40 and 50 are respectively implemented by wirings 42 and 52 printed on a circuit board in the form of coils. The wiring 42 is connected to the voltage source 70, FIG. 7, at points R and R' while the wiring 42 is connected to the same at points S and S'. The points R and S and points R' and S' each are connected to the positive terminal or the negative terminal of the voltage source 70 in a pair. The wirings 42 and 52 are wound in opposite directions to each other. In this configuration, the devices 40 and 50 generate magnetic fields in opposite directions when applied with voltages of the same sign from the voltage source 70.

When the end portions or permanent magnets 21 and 22 of the vibrator 20 generate identical magnetic fields at their surfaces facing the devices 40 and 50, the vibrator 20 also performs the second operation. To cause the vibrator 20 to vibrate, positive and negative pulse voltages may be alternately applied to only one of the devices 40 or 50, as shown in FIG. 10, or pulse voltages of the same phase may be applied to both of the devices 40 and 50, as shown in FIG. 11.

When the end portions or permanent magnets 21 and 22 of the vibrator 20 generate different magnetic fields at their surfaces facing the devices 40 and 50, the vibrator 20 also performs the first operation. To cause the vibrator 20 to vibrate, pulse voltages of opposite phases are respectively applied from the voltage source 70 to the devices 40 and 50.

As stated above, the vibrator 20 performs either one of the first and second operations in accordance with the directions of magnetic fields generated by the devices 40 and 50 and the magnetic polarities of the end portions or magnets 21 and 22.

Figure 13:
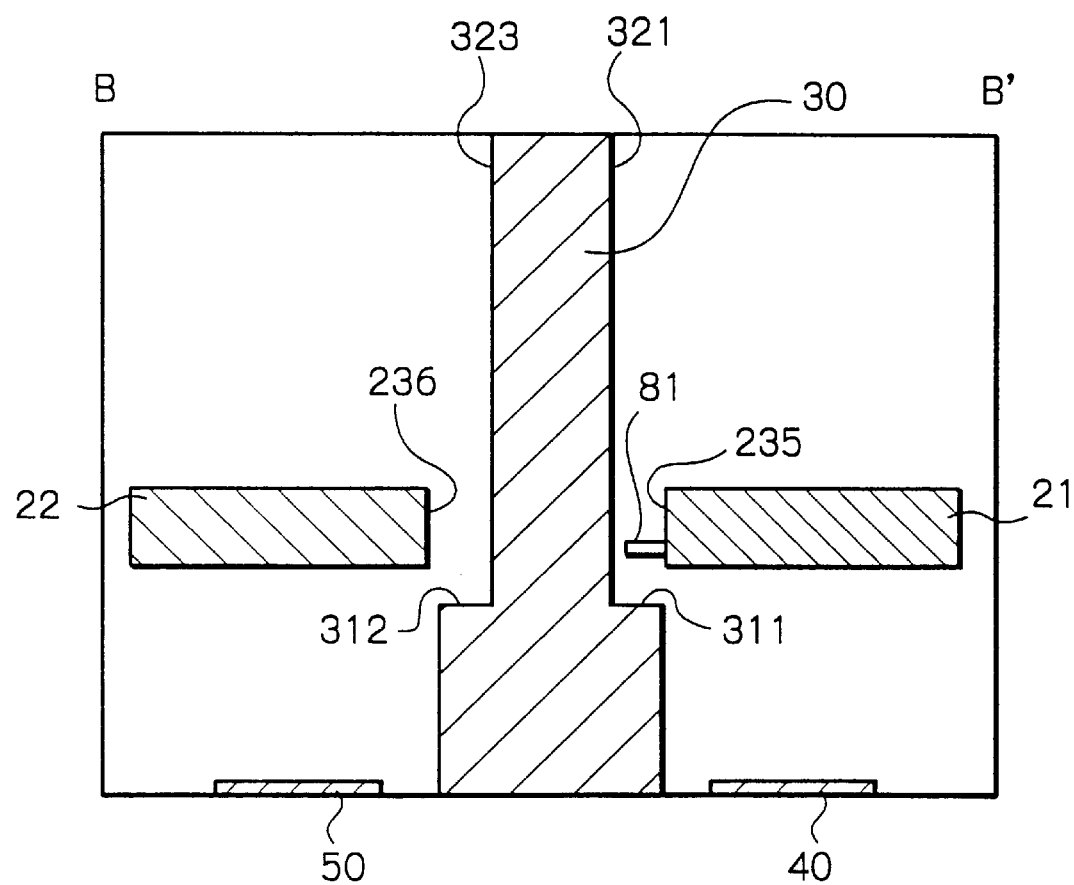
FIGS. 13 and 14 are sections along line B–B' of FIG. 1 (up-and-down and right-and-left directions).

FIG. 13 shows a specific positional relation between the vibrator 20, the post 30 and the devices 40 and 50. As shown, a lug 81 for protection protrudes from the right inner surface 235 of the right end portion 21 of the vibrator 20. When the end portion 21 moves downward by a preselected amount, the lug 81 abuts against the right non-contact region 311 or the right side 321 of the post 30 and thereby stops the movement of the end portion 21. That is, the downward movable range of the end portion 21 is limited by the positional relation between the lug 81 and the non-contact portion 311 or the right side 321. Particularly, the lug 81 prevents the end portion 21 overlying the device 40 from contacting the device 40.

If desired, a lug similar to the lug 81 may protrude from the left inner surface 236 of the left end portion 22 for the same purpose. Particularly, such a lug prevents the left end portion 22 overlying the device 50 from contacting the device 50.

Figure 14:
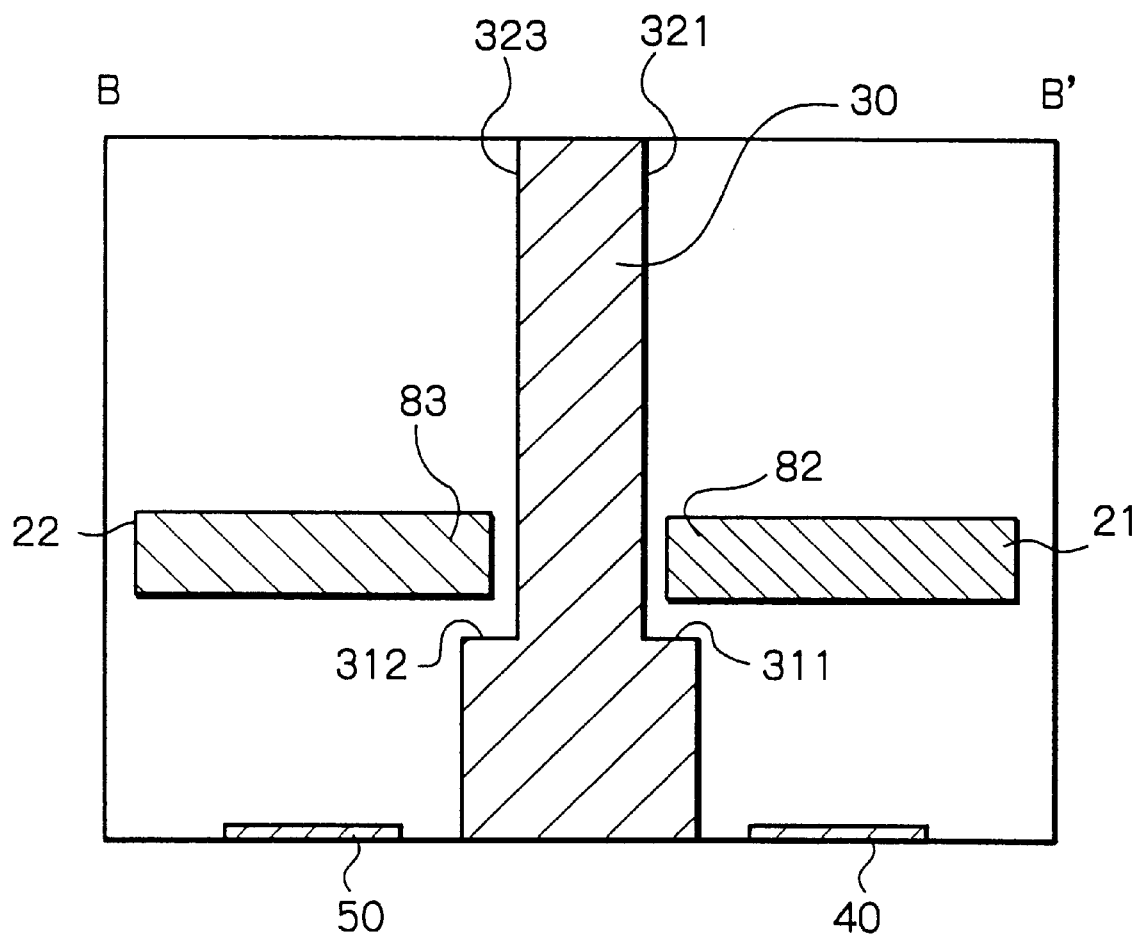

FIG. 14 shows another specific positional relation between the vibrator 20, the post 30, and the devices 40 and 50. As shown, the right end portion 21 of the vibrator 20 includes an extension 82 positioned above the right non-contact region 311 of the post 30. Likewise, the left end portion 22 includes an extension 83 positioned above the left non-contact portion 312 of the post 30.

When the right end portion 21 moves downward by a preselected amount, the extension 82 abuts against the right non-contact region 311 or the right side 321 of the post 30 and thereby stops the movement of the end portion 21. That is, the downward movable range of the end portion 21 is limited by the positional relation between the extension 82 and the non-contact portion 311 or the right side 321. Particularly, the extension 82 prevents the end portion 21 over lying the device 40 from contacting the device 40.

When the left end portion 22 moves downward by a preselected amount, the extension 83 abuts against the left non-contact region 312 or the left side 323 of the post 30 and thereby stops the movement of the end portion 22. That is, the downward movable range of the end portion 22 is limited by the positional relation between the extension 83 and the non-contact portion 312 or the left side 323. Particularly, the extension 83 prevents the end portion 22 overlying the device 50 from contacting the device 50.

The positional relations shown in FIGS. 13 and 14 each prevent the vibrator 20 required to move by more than a preselected amount from contacting or hitting against the device 40 or 50. This successfully protects the devices 40 and 50 from damage.

To prevent the vibrator 20 from contacting or hitting against the top of the case 10, the left side 323 and/or the right side 321 of the post 30 may be formed with a lug at the connecting portion 33, although not shown specifically. When one end of the vibrator 20 moves upward by a preselected amount, the above lug abuts against corresponding one of the lug 81 and extensions 82 and 83 to thereby stop the movement of the vibrator 20. This is derived from the positional relation between the above lug and the lug 82 or the extension 82 or 83.

In summary, in accordance with the present invention, a vibration generating unit includes a vibrator whose amount of vibration is controlled by pulse voltages applied to magnetic field generating devices. The vibrator is substantially symmetrical in configuration and weight in the right-and-left direction and has opposite end portions exerting substantially the same magnetic force. Therefore, only if the pulse voltages applied to the magnetic field generating devices are constant, the vibration generating unit vibrates by the same amount as other similar vibration generating units and can vibrate stably.

Further, the amount of vibration of the vibration generating unit can be adjusted on the basis of the frequency and voltage of the pulse voltages applied to the magnetic field generating devices. This insures easy control over the vibration of the vibration generating unit.

Various modifications will become possible for those skilled in the art after receiving the teachings of the present disclosure without departing from the scope thereof.

What is claimed is:

1. A vibration generating unit comprising:
   a magnetic field generating device comprising a magnetic field generating section for generating a magnetic field in response to a voltage applied thereto, and a voltage source for applying said voltage to said magnetic field generating section;
   a vibrator comprising a fulcrum portion and a pair of magnetized portions positioned at opposite sides of said fulcrum portion, said pair of magnetized portions each being movable about said fulcrum portion in response to the magnetic field generated by said magnetic field generating section; and
   a post comprising a support portion for said fulcrum portion of said vibrator.

2. A unit as claimed in claim 1, wherein said magnetic field generating section comprises a pair of magnetic field generating portions respectively corresponding to said pair of magnetized portions of said vibrator, said pair of magnetized portions each being movable in response to the magnetic field generated by a corresponding one of said pair of magnetic field generating portions.

3. A unit as claimed in claim 1, wherein said voltage source comprises voltage adjusting means for adjusting the voltage to be applied to said magnetic field generating section and duration adjusting means for adjusting a duration of said voltage.

4. A unit as claimed in claim 1, wherein said magnetic field generating section comprises a coil or a coil-like wiring.

5. A unit as claimed in claim 1, wherein said post further comprises a stop portion for restricting an up-down movement of said vibrator when said vibrator contacts said stop.

6. A unit as claimed in claim 1, wherein said support portion and said fulcrum portion comprise an affixing member extending throughout said post and said vibrator.

7. A unit as claimed in claim 1, wherein said support portion and said fulcrum portion comprise a lug and a recess respectively, said lug being received in said recess, for supporting said vibrator.

8. A unit as claimed in claim 1, wherein said vibrator further comprises a stop capable of contacting said post to thereby restrict an up-and-down movement of said vibrator.

9. A unit as claimed in claim 8, wherein said stop comprises a pair of stops respectively corresponding to said pair of magnetized portions of said vibrator.

10. A vibration generator comprising:
    a magnetic field generator for generating a magnetic field in response to a voltage applied thereto;
    a voltage source for applying said voltage to said magnetic field generator;
    a vibrator, said magnetic field causing a movement of said vibrator; and
    a fixed post being unmoving during said movement of said vibrator, said fixed post providing a support to said vibrator,
    wherein said vibrator comprises a left portion and a right portion and wherein said fixed post is oriented between said left portion and said right portion.

11. The vibration generator as claimed in claim 10 wherein said fixed post extends substantially in an up-down direction and said left and right portions move in said up-down direction during said movement.

12. The vibration generator as claimed in claim 11 wherein said left portion and said right portion move in opposition to each other during said movement, said movement of said vibrator being about an axis, said axis extending orthogonally to said up-down direction.

13. A vibration generator comprising:
    a case having a bottom surface, a top surface substantially parallel to said bottom surface, a left half, and a right half, an orthogonal direction between said bottom surface and said top surface defining an up-down direction, a center of said case bisecting said left half and said right half;

a pair of magnetic field generating portions for generating a magnetic field in response to a voltage applied thereto, a one of said pair being oriented in the left half of said case, and another one of said pair being oriented in the right half of said case;

a voltage source for applying voltages to said pair of magnetic field generating portions;

a vibrator comprising a left portion and a right portion, said left portion being oriented in the left half of said case, said right portion being oriented in said right half of said case, said left portion having a substantial surface and said right portion having a substantial surface, said substantial surfaces of said left and right portions being substantially parallel to said top and bottom surfaces of said case, said magnetic field causing a movement of said left portion and said right portion in said up-down direction in opposition to each other; and a support having a substantial dimension in said up-down direction, said center of said case intersecting said support, said support being stationary during said movement, said support defining a maximum movement by impeding, alternatively, the left portion and the right portion of the vibrator during said movement.

* * * * *